(12) United States Patent
Park et al.

(10) Patent No.: US 8,349,497 B2
(45) Date of Patent: Jan. 8, 2013

(54) ELECTROLYTE FOR RECHARGEABLE LITHIUM BATTERY AND RECHARGEABLE LITHIUM BATTERY INCLUDING THE SAME

(75) Inventors: Na-Rae Park, Suwon-si (KR); Jin-Sung Kim, Suwon-si (KR); Su-Hee Han, Suwon-si (KR); Jin-Hyunk Lim, Suwon-si (KR); Mi-Hyeun Oh, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 566 days.

(21) Appl. No.: 12/635,545

(22) Filed: Dec. 10, 2009

(65) Prior Publication Data

US 2010/0248021 A1 Sep. 30, 2010

(30) Foreign Application Priority Data

Mar. 31, 2009 (KR) ........................ 10-2009-0027646

(51) Int. Cl.
*H01M 6/14* (2006.01)
(52) U.S. Cl. ........ 429/302; 429/307; 429/306; 429/330; 429/339; 429/199; 429/200; 252/62.2
(58) Field of Classification Search ................. 429/302, 429/307, 306, 330, 339, 199, 200; 252/62.2
See application file for complete search history.

(56) References Cited

U.S. PATENT DOCUMENTS

| 7,244,531 B2 | 7/2007 | Kim et al. |
| 2006/0269846 A1 | 11/2006 | Xu et al. |

FOREIGN PATENT DOCUMENTS

| JP | 2000-223152 A | 8/2000 |
| JP | 2004-175666 | 6/2004 |
| JP | 2006-173014 | 6/2006 |
| KR | 10-2008-0097599 | 11/2008 |

OTHER PUBLICATIONS

KIPO Notice of Allowance dated Nov. 16, 2010 for Korean Application No. 9-5-2010-051948295.

*Primary Examiner* — Laura Weiner
(74) *Attorney, Agent, or Firm* — Knobbe Martens Olson & Bear LLP

(57) ABSTRACT

Disclosed is an electrolyte for a rechargeable lithium battery and a rechargeable lithium battery including the same. The electrolyte includes a lithium salt, a trialkylsilyl cyanide compound represented by the following Chemical Formula 1, and an organic solvent.

Chemical Formula 1

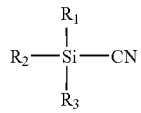

In the above Chemical Formula 1, $R_1$ to $R_3$ are the same or different, and selected from C1 to C6 alkyls.

20 Claims, 1 Drawing Sheet

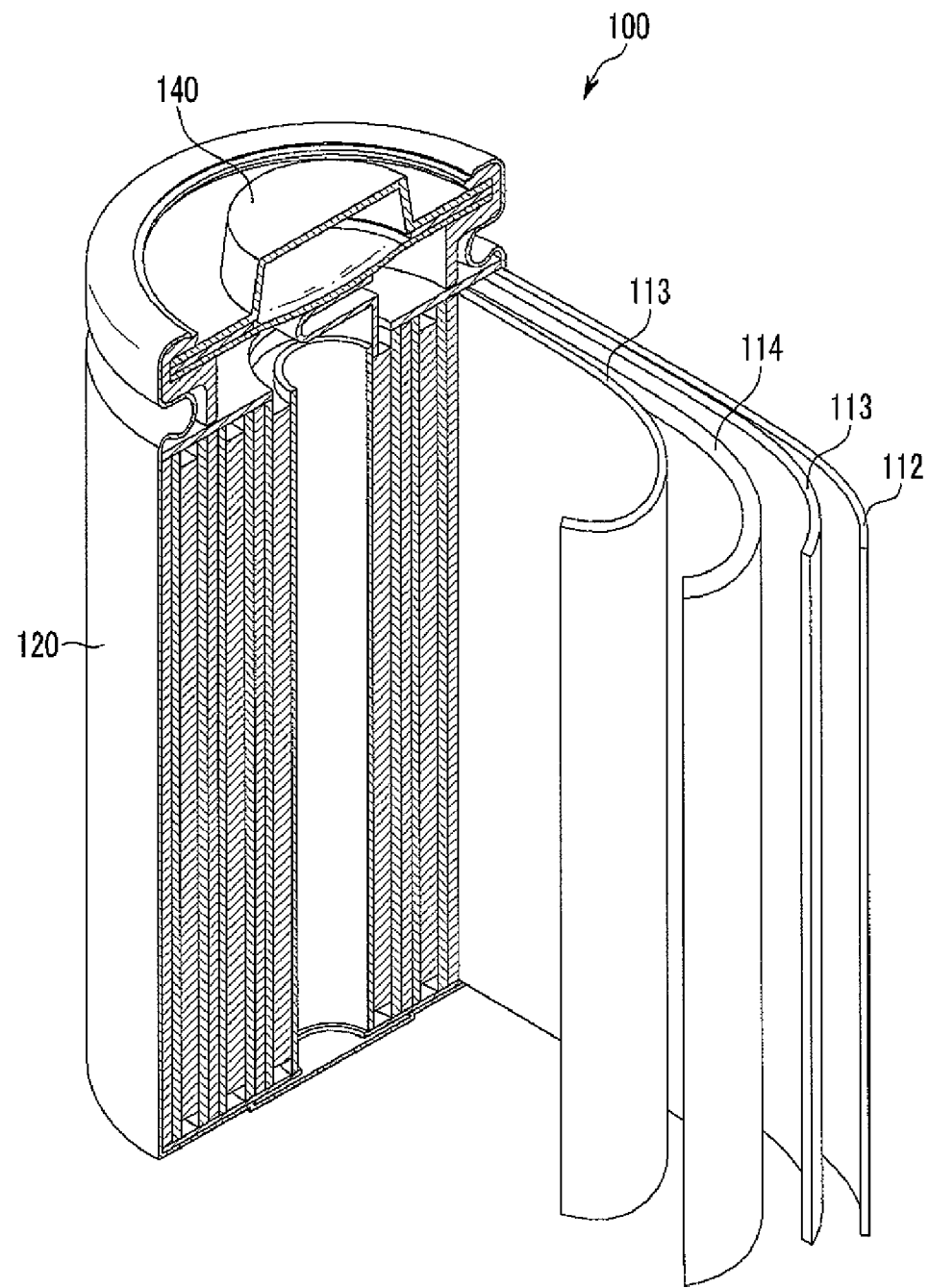

ELECTROLYTE FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of Korean Patent Application No. 10-2009-0027646 filed in the Korean Intellectual Property Office on Mar. 31, 2009, the entire contents of which are incorporated herein by reference.

BACKGROUND OF THE INVENTION

1. Field of the Invention

This disclosure relates to an electrolyte for a rechargeable lithium battery and a rechargeable battery including the same.

2. Description of the Related Art

Batteries transform chemical energy generated from an electrochemical oxidation-reduction reaction of chemical materials inside the battery into electrical energy. The batteries are divided into primary batteries, which should be discarded after the energy inside the batteries is consumed, and rechargeable batteries, which can be recharged multiple times.

Among the batteries, the rechargeable battery can charge/discharge multiple times through reversible transformation between chemical energy and electrical energy.

Recent development in high-end electronic industries has made electronic devices smaller and lighter and this has lead to an increase in portable electronic devices. Since the portable electronic devices demand batteries with high energy density, researchers are studying vigorously to develop rechargeable lithium batteries.

The rechargeable lithium battery is fabricated by injecting electrolyte into a battery cell, which includes a positive electrode including a positive active material capable of intercalating/deintercalating lithium ions and a negative electrode including a negative active material capable of intercalating/deintercalating lithium ions.

The electrolyte significantly affects the performance of the rechargeable lithium battery.

SUMMARY OF THE INVENTION

One aspect of the present embodiments provides an electrolyte for a rechargeable lithium battery being capable of improving cycle-life characteristics at a high temperature.

Another aspect of the present embodiments provides a rechargeable lithium battery including the electrolyte.

According to one aspect of the present embodiments, an electrolyte for a rechargeable lithium battery is provided that includes a lithium salt, trialkylsilyl cyanide compound represented by the following Chemical Formula 1, and an organic solvent:

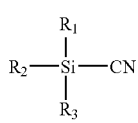

Chemical Formula 1

In the Chemical Formula 1, $R_1$ to $R_3$ are the same or different, and one selected from C1 to C6 alkyls, respectively.

The trialkylsilyl cyanide compound may include trimethylsilyl cyanide represented by the following Chemical Formula 2:

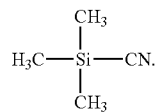

Chemical Formula 2

The electrolyte for a rechargeable lithium battery may further include a halogenated carbonate compound.

The halogenated carbonate compound includes fluoroethylene carbonate.

The halogenated carbonate compound may be included in an amount of about 0.1 to about 10 wt % based on the total amount of the electrolyte.

The trialkylsilyl cyanide compound may be included in an amount of about 0.1 to about 10 wt % based on the total amount of the electrolyte.

According to another aspect of the present embodiments, a rechargeable lithium battery is provided that includes a positive electrode, a negative electrode, and an electrolyte including a lithium salt, the trialkylsilyl cyanide compound represented by the Chemical Formula 1, and an organic solvent. The trialkylsilyl cyanide compound may include trimethylsilyl cyanide represented by the Chemical Formula 2.

BRIEF DESCRIPTION OF THE DRAWING

FIG. 1 is a schematic view showing a rechargeable lithium battery according to one embodiment.

DETAILED DESCRIPTION OF THE INVENTION

The present embodiments will be described more fully hereinafter, in which exemplary embodiments are shown. The present embodiments may, however, be embodied in many different forms and should not be construed as limited to the exemplary embodiments set forth herein.

The electrolyte for a rechargeable lithium battery according to one embodiment includes a lithium salt, a trialkylsilyl cyanide compound, and an organic solvent.

Lithium salts supply lithium ions in the battery, and operate a basic operation of a rechargeable lithium battery. The lithium salts of the present embodiments are not limited and examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$, where x and y are natural number, LiCl, LiI, or combinations thereof. In one embodiment, $LiPF_6$, $LiBF_4$, $LiAsF_6$, $LiClO_4$, $LiN(CF_3SO_2)_2$, $LiN(C_2F_5SO_2)_2$, $CF_3SO_3Li$, or combinations thereof may be used.

The lithium salt may be used at a concentration of from about 0.1 to about 2.0M.

The trialkylsilyl cyanide compound may be represented by the following Chemical Formula 1:

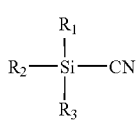

Chemical Formula 1 wherein, $R_1$ to $R_3$ are the same or different, and comprise $C_1$ to $C_6$ alkyls.

The trialkylsilyl cyanide compound may include trimethylsilyl cyanide wherein $R_1$ to $R_3$ are methyl, represented by the following Chemical Formula 2:

Chemical Formula 2

Not wishing to be bound to a particular theory, the trialkylsilyl cyanide compound inhibits degradation of electrolyte characteristics, and thereby prevents decrease of battery capacity after repetitive charge and discharge resulting in improvement of capacity retention and cycle-life characteristics.

The trialkylsilyl cyanide compound may be included in an amount of from about 1 to about 10 wt % based on the total amount of the electrolyte. According to the present embodiments, it is possible to improve cycle-life of rechargeable lithium batteries.

The organic solvent acts as a medium for transmitting lithium ions, and examples of the organic solvent include carbonate compounds, ester compounds, ether compounds, ketone compounds, and combinations thereof.

The carbonate compounds may include linear carbonate compounds, cyclic carbonate compounds, and combinations thereof.

The linear carbonate compounds may include, for example, dimethyl carbonate (DMC), ethylmethyl carbonate (EMC), diethyl carbonate (DEC), dipropyl carbonate (DPC), methylpropyl carbonate (MPC), and ethylpropyl carbonate (EPC), and the cyclic carbonate compound may include, for example, ethylene carbonate (EC), propylene carbonate (PC), and butylene carbonate (BC).

When the linear carbonate compounds and cyclic carbonate compounds are mixed, an organic solvent having a high dielectric constant and low viscosity can be provided. The cyclic carbonate compounds and linear carbonate compounds may be mixed together at a volume ratio, for example, of about 1:1 to about 1:9. Examples of mixed organic solvents of linear carbonate compound and cyclic carbonate compound include a mixture including ethylene carbonate, ethylmethyl carbonate, and diethyl carbonate at a predetermined ratio.

The organic solvent may be included in a balance amount except for other components. For example, the organic solvent may be included in an amount from about 1 to about 90 wt % based on the total amount of the electrolyte.

The electrolyte for a rechargeable lithium battery further includes a halogenated carbonate compound. The halogenated carbonate compound acts as an additive for improving the performance of the electrolyte. For example, the halogenated carbonate compound may be fluoroethylene carbonate (FEC).

The halogenated carbonate compound may improve long-term capacity retention along with the above trialkylsilyl cyanide compound.

The halogenated carbonate compound may be included in an amount of from about 1 to about 10 wt % based on the total amount of the electrolyte. According to the present embodiments, it is possible to enhance cycle-life and long-term cycle-life characteristics.

Hereafter, a rechargeable lithium battery according to another embodiment will be described by referring to FIG. 1.

FIG. 1 is a schematic view showing a rechargeable lithium battery according to one embodiment.

Referring to FIG. 1, the rechargeable lithium battery 100 includes a battery cell including a positive electrode 114, a negative electrode 112 facing the positive electrode 114, a separator 113 interposed between the positive electrode 114 negative electrode 112 and, an electrolyte (not shown) impregnating the positive electrode 114, the negative electrode 112, and the separator 113, a battery case 120, and a sealing member 140 sealing the battery case 120.

The positive electrode 114 includes a current collector and a positive active material layer formed on the current collector.

The current collector may be an aluminum foil, but is not limited thereto.

The positive active material layer includes a positive active material, a binder, and a conductive material.

For the positive active material, compounds being capable of reversibly intercalating and deintercalating lithium ions may be used without limitation. Examples of the positive active material include, for example, composite oxide including lithium (Li) and a metal such as cobalt (Co), manganese (Mn), nickel (Ni), and combinations thereof as follows:

$Li_aA_{1-b}B_bD_2$ wherein, in the above formula, $0.90 \leq a \leq 1.8$, and $0 \leq b \leq 0.5$; $Li_aE_{1-b}B_bO_{2-c}D_c$ wherein, in the above formula, $0.90 \leq a \leq 1.8$, $0 \leq b \leq 0.5$, and $0 \leq c \leq 0.05$; $LiE_{2-b}B_bO_{4-c}D_c$ wherein, in the above formula, $0 \leq b \leq 0.5$, and $0 \leq c \leq 0.05$; $Li_aNi_{1-b-c}Co_bB_cD_\alpha$ wherein, in the above formula, $0.90 \leq a \leq 1.8$, $0 \leq b \leq 0.5$, $0 \leq c \leq 0.05$, and $0 \leq \alpha \leq 2$; $Li_aNi_{1-b-c}Co_bB_cO_{2-\alpha}L_\alpha$ wherein, in the above formula, $0.90 \leq a \leq 1.8$, $0 \leq b \leq 0.5$, $0 \leq c \leq 0.05$, and $0 < \alpha < 2$; $Li_aNi_{1-b-c}Co_bB_cO_{2-\alpha}L_2$ wherein, in the above formula, $0.90 \leq a \leq 1.8$, $0 \leq b \leq 0.5$, $0 \leq c \leq 0.05$, and $0 < \alpha < 2$; $Li_aNi_{1-b-c}Mn_bB_cD_\alpha$ wherein, in the above formula, $0.90 \leq a \leq 1.8$, $0 \leq b \leq 0.5$, $0 \leq c \leq 0.05$, and $0 < \alpha \leq 2$; $Li_aNi_{1-b-c}Mn_bB_cO_{2-\alpha}L_\alpha$ wherein, in the above formula, $0.90 \leq a \leq 1.8$, $0 \leq b \leq 0.5$, $0 \leq c \leq 0.05$, and $0 < \alpha < 2$; $Li_aNi_{1-b-c}Mn_bB_cO_{2-\alpha}L_\alpha$ wherein, in the above formula, $0.90 \leq a \leq 1.8$, $0 \leq b \leq 0.5$, $0 \leq c \leq 0.05$, and $0 < a < 2$; $Li_aNi_bE_cG_dO_2$ wherein, in the above formula, $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ wherein, in the above formula, $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ wherein, in the above formula, $0.90 \leq a \leq 1.8$, and $0.001 \leq b \leq 0.1$; $Li_aCoG_bO_2$ wherein, in the above formula, $0.90 \leq a \leq 1.8$, and $0.001 \leq b \leq 0.1$; $Li_aMnG_bO_2$ wherein, in the above formula, $0.90 \leq a \leq 1.8$, and $0.001 \leq b \leq 0.1$; $Li_aMn_2G_bO_4$ wherein, in the above formula, $0.90 \leq a \leq 1.8$, and $0.001 \leq b \leq 0.1$; $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above formulae, A can be Ni, Co, Mn, and combinations thereof, B can be Al, Ni, Co, Mn, Cr, Fe, Mg, Sr, V, a rare earth element, and combinations thereof, D can be O, F, S, P, and combinations thereof, E selected from the group consisting of Co, Mn, and combinations thereof, L selected from the group consisting of F, S, P, and combinations thereof, G is selected from the group consisting of Al, Cr, Mn, Fe, Mg, La, Ce, Sr, V, and combinations thereof, Q is selected from the group consisting of Ti, Mo, Mn, and combinations thereof, I selected from the group consisting of Cr, V, Fe, Sc, Y, and combinations thereof, and J selected from the group consisting of V, Cr, Mn, Co, Ni, Cu, and combinations thereof.

The binder improves binding properties of the positive active material particles to one another, and also with a current collector. Any material may be used for the binder without limitation. Preferably, the binder does not causes chemical change and improves adherence. Examples of the binder include polyvinyl alcohol, carboxylmethyl cellulose, hydroxypropylene cellulose, diacetylene cellulose, polyvinyl chloride, carboxylated polyvinyl chloride, polyvinyl difluoride, an ethylene oxide-containing polymer, polyvinyl pyrrolidone, polyurethane, polytetrafluoroethylene, polyvinylidene fluoride, polyethylene, polypropylene, styrene-butadiene rubber, acrylated styrene-butadiene rubber, an epoxy resin, and nylon.

The conductive material is included to improve electrode conductivity. Any electrically conductive material may be used as a conductive material unless it causes a chemical change. Examples of the conductive material include polyphenylene derivatives, natural graphite, artificial graphite, carbon black, acetylene black, ketjen black, carbon fiber, and metal powders and metal fiber including copper, nickel, aluminum silver, and the like.

The compound may have a coating layer on the surface. The coating layer may include a compound such as an oxide, hydroxide, oxyhydroxide, oxycarbonate, hydroxycarbonate, and combinations thereof including metal or semi-metal selected from Mg, Al, Co, K, Na, Ca, Si, Ti, V, Sn, Ge, Ga, B, As, Zr, or combinations thereof. The compound of a coating layer may be amorphous or crystalline.

The negative electrode 112 includes a current collector and a negative active material layer formed on the current collector.

The current collector may be, for example, a copper foil, a nickel foil, a stainless steel foil, a titanium foil, a nickel foam, a polymer substrate coated with a conductive metal, and combinations thereof.

The negative active material layer includes a negative active material, a binder, and a conductive material.

For the negative active material, a material that reversibly intercalates/deintercalates lithium ions, lithium, lithium alloy, a material being capable of alloying with lithium, materials being doping and dedoping lithium, transition metal oxide, or combinations thereof may be used. The material that reversibly intercalates/deintercalates lithium ions includes carbon-based negative active materials.

The carbon-based negative active materials may be, for example, crystalline carbon, amorphous carbon, or combinations thereof. The crystalline carbon may be non-shaped, or sheet, flake, spherical, or fiber shaped natural graphite or artificial graphite. The amorphous carbon may be a soft carbon (carbon obtained through sintering at a low temperature), a hard carbon (carbon obtained through sintering at a high temperature), mesophase pitch carbide, fired coke, and so on.

The materials being capable of alloying with lithium include an element such as Na, K, Rb, Cs, Fr, Be, Mg, Ca, Sr, Ba, Ra, Ti, Ag, Zn, Cd, Al, Ga, In, Si, Ge, Sn, Pb, Sb, Bi, and combinations thereof.

Examples of the transition elements oxide, compounds being doping and dedoping lithium, or compounds being capable of reversibly reacting lithium include, for example, vanadium oxide, lithium vanadium oxide, Si, $SiO_x$ (0<x<2), Sn, $SnO_2$, composite tin alloys, and combinations thereof.

The binder and conductive material can be the same as described above.

The separator 113 may be a single layer or multilayer, for example made of polyethylene, polypropylene, polyvinylidene fluoride, or combinations thereof.

The electrolyte includes a lithium salt, trialkylsilyl cyanide, and an organic solvent. Redundant description is omitted.

The following examples illustrate the present embodiments in more detail. These examples, however, should not in any sense be interpreted as limiting the scope of the present embodiments.

Preparation of Electrolyte

EXAMPLE 1

An electrolyte for a rechargeable lithium battery was prepared by adding about 1 wt % of trimethylsilyl cyanide (TMSC) to an organic solvent with 1.15M $LiPF_6$ dissolved therein. The organic solvent was prepared by mixing ethylene carbonate (EC):ethylmethyl carbonate (EMC):diethyl carbonate (DEC) at a ratio of about 1:1:1.

EXAMPLE 2

An electrolyte for a rechargeable lithium battery was prepared according to the same method as Example 1, except that trimethylsilyl cyanide (TMSC) was included in an amount of about 3 wt %.

EXAMPLE 3

An electrolyte for a rechargeable lithium battery was prepared according to the same method as Example 1, except that trimethylsilyl cyanide (TMSC) was included in an amount of about 5 wt %.

EXAMPLE 4

An electrolyte for a rechargeable lithium battery was prepared according to the same method as Example 1, except that trimethylsilyl cyanide (TMSC) was included in an amount of about 6 wt %.

EXAMPLE 5

An electrolyte for a rechargeable lithium battery was prepared according to the same method as Example 1, except that fluoroethylene carbonate (FEC) was further included to an amount of about 3 wt %.

EXAMPLE 6

An electrolyte for a rechargeable lithium battery was prepared according to the same method as Example 2, except that fluoroethylene carbonate (FEC) was further included to an amount of about 3 wt %.

EXAMPLE 7

An electrolyte for a rechargeable lithium battery was prepared according to the same method as Example 2, except that fluoroethylene carbonate (FEC) was further included to an amount of about 5 wt %.

EXAMPLE 8

An electrolyte for a rechargeable lithium battery was prepared according to the same method as Example 1, except that fluoroethylene carbonate (FEC) was further included to an amount of about 10 wt %.

COMPARATIVE EXAMPLE 1

An electrolyte for a rechargeable lithium battery was prepared by adding 1.15M of $LiPF_6$ to an organic solvent prepared by mixing ethylene carbonate (EC):ethylmethyl carbonate (EMC):diethyl carbonate (DEC) at a ratio of about 1:1:1.

COMPARATIVE EXAMPLE 2

An electrolyte for a rechargeable lithium battery was prepared according to the same method as Comparative Example 1, except that trimethylsilyl benzenesulfonate (TMSBS) was further included to an amount of about 3 wt %.

COMPARATIVE EXAMPLE 3

An electrolyte for a rechargeable lithium battery was prepared according to the same method as Comparative Example 1, except that trimethylsilyl acetate (TMSA) was further included to an amount of about 3 wt %.

COMPARATIVE EXAMPLE 4

An electrolyte for a rechargeable lithium battery was prepared according to the same method as Comparative Example 1, except that trimethylsilyl trifluoroacetate (TMSTFA) was further included to an amount of about 3 wt %.

COMPARATIVE EXAMPLE 5

An electrolyte for a rechargeable lithium battery was prepared according to the same method as Comparative Example 1, except that fluoroethylene carbonate (FEC) was further included to an amount of about 3 wt %.

COMPARATIVE EXAMPLE 6

An electrolyte for a rechargeable lithium battery was prepared according to the same method as Comparative Example 1, except that trimethylsilyl propanoate (TMSP) was further included to an amount of about 3 wt %.

COMPARATIVE EXAMPLE 7

An electrolyte for a rechargeable lithium battery was prepared according to the same method as Comparative Example 1, except that trimethylsilyl trifluoromethane (TMSTFM) was further included to an amount of about 3 wt %.

The electrolytes of Examples 1 to 8 and Comparative Examples 1 to 7 are shown in Table 1:

TABLE 1

| No. | TMSC | Other additive (wt %) | FEC |
|---|---|---|---|
| Example 1 | 1 | — | — |
| Example 2 | 3 | — | — |
| Example 3 | 5 | — | — |
| Example 4 | 6 | — | — |
| Example 5 | 1 | — | 3 |
| Example 6 | 3 | — | 3 |
| Example 7 | 3 | — | 5 |
| Example 8 | 3 | — | 10 |
| Comparative Example 1 | — | — | — |
| Comparative Example 2 | — | TMSBS (3) | — |
| Comparative Example 3 | — | TMSA (3) | — |
| Comparative Example 4 | — | TMSTFA (3) | — |
| Comparative Example 5 | — | — | 3 |
| Comparative Example 6 | — | TMSP (3) | — |
| Comparative Example 7 | — | TMSTFM (3) | — |

Fabrication of Rechargeable Lithium Battery Cells

Battery cells were fabricated by using $LiCoO_2$ and $Ni_{0.5}Co_{0.2}Mn_{0.3}$ as a positive active material, using artificial graphite as a negative active material, and using a polyethylene film as a separator. Subsequently, the electrolytes prepared according to Examples 1 to 8 and Comparative Examples 1 to 7 were injected into the battery cells respectively to thereby fabricate rechargeable lithium batteries of 800 mAh capacity.

Performance Test

The rechargeable lithium battery cells fabricated in the above-described methods were charged and discharged 100 times and capacity ratios compared with initial capacities were measured.

The results are shown in Table 2.

TABLE 2

| No. | Capacity after 100th cycle (%) |
|---|---|
| Example 1 | 80 |
| Example 2 | 85 |
| Example 3 | 87 |
| Example 4 | 87 |
| Example 5 | 93 |
| Example 6 | 95 |
| Example 7 | 96 |
| Example 8 | 96 |
| Comparative Example 1 | 60 |
| Comparative Example 2 | 62 |
| Comparative Example 3 | 42 |
| Comparative Example 4 | 24 |
| Comparative Example 5 | 91 |
| Comparative Example 6 | 66 |
| Comparative Example 7 | 46 |

As shown in Table 2, the rechargeable lithium battery cells including the electrolytes according to Examples 1 to 8 showed improved capacity retention compared with those including the electrolytes according to Comparative Examples 1 to 4, 6, and 7 after 100 times charge and discharge. From the results, trimethylsilyl cyanide improves capacity retention.

The battery cells including fluoro ethylene carbonate (FEC) as well as trimethylsilylcyanide (TMSC) according to Examples 5 to 8 showed more improved capacity retention.

Performance Test 2

The rechargeable lithium battery cells fabricated above were charged and discharged 300 times. The $300^{th}$ capacity retention relative to initial capacity was measured.

The results are shown in Table 3.

TABLE 3

| | Capacity retention after 300th cycle (%) |
|---|---|
| Example 5 | 81 |
| Example 6 | 86 |
| Example 7 | 88 |
| Example 8 | 89 |
| Comparative Example 5 | 65 |

As shown in Table 3, the rechargeable lithium battery cells including the electrolytes including trimethylsilylcyanide (TMSC) and fluoroethylene carbonate (FEC) as an electrolyte additive according to Examples 5 to 8 showed higher capacity retention after 300 times charge and discharge compared to the rechargeable lithium battery cell including only fluoroethylene carbonate (FEC) according to Comparative Example 5. From the result, the electrolyte including trimethylsilylcyanide (TMSC) combined with fluoroethylene carbonate (FEC) improves long-term capacity retention.

While the present embodiments have been described in connection with what is presently considered to be practical exemplary embodiments, it is to be understood that the present embodiments are not limited to the disclosed embodiments, but, on the contrary, is intended to cover various modifications and equivalent arrangements included within the spirit and scope of the appended claims.

What is claimed is:

1. An electrolyte for a rechargeable lithium battery, comprising:
a lithium salt,
a trialkylsilyl cyanide compound represented by the following Chemical Formula 1,

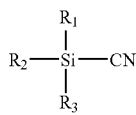

Chemical Formula 1 and
an organic solvent,
wherein in the Chemical Formula 1, $R_1$ to $R_3$ are the same or different, and are each selected from the group consisting of $C_1$ to $C_6$ alkyls.

2. The electrolyte of claim 1, wherein the trialkylsilyl cyanide compound comprises trimethylsilyl cyanide represented by the following Chemical Formula 2:

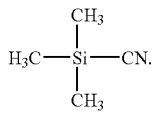

Chemical Formula 2

3. The electrolyte of claim 1, wherein the electrolyte further comprises a halogenated carbonate compound.

4. The electrolyte of claim 3, wherein the halogenated carbonate compound comprises fluoroethylene carbonate.

5. The electrolyte of claim 3, wherein the halogenated carbonate compound is included in an amount of from about 0.1 to about 10 wt % based on the total amount of the electrolyte.

6. The electrolyte of claim 1, wherein the trialkylsilyl cyanide compound is included in an amount of from about 0.1 to about 10 wt % based on the total amount of the electrolyte.

7. A rechargeable lithium battery comprising
a positive electrode,
a negative electrode, and
an electrolyte including a lithium salt, a trialkylsilyl cyanide compound represented by the following Chemical Formula 1, and an organic solvent

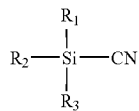

Chemical Formula 1 wherein in the Chemical Formula 1, $R_1$ to $R_3$ are the same or different, and are each selected from the group consisting of $C_1$ to $C_6$ alkyls.

8. The rechargeable lithium battery of claim 7, wherein the trialkylsilyl cyanide compound comprises trimethylsilyl cyanide represented by the following Chemical Formula 2:

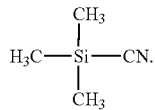

Chemical Formula 2

9. The rechargeable lithium battery of claim 7, wherein the electrolyte further comprises a halogenated carbonate compound.

10. The rechargeable lithium battery of claim 9, wherein the halogenated carbonate compound comprises fluoroethylene carbonate.

11. The rechargeable lithium battery of claim 9, wherein the halogenated carbonate compound is included in an amount of from about 0.1 to about 10 wt % based on the total amount of the electrolyte.

12. The rechargeable lithium battery of claim 7, wherein the trialkylsilyl cyanide compound is included in an amount of from about 0.1 to about 10 wt % based on the total amount of the electrolyte.

13. The rechargeable lithium battery of claim 7, wherein the positive electrode comprises a positive active material selected from the group consisting of $LiCoO_2$, nickel-cobalt-manganese composite compound and combinations thereof.

14. An electronic device comprising the rechargeable lithium battery of claim 7.

15. An electronic device comprising the rechargeable lithium battery of claim 8.

16. An electronic device comprising the rechargeable lithium battery of claim 9.

17. An electronic device comprising the rechargeable lithium battery of claim 10.

18. An electronic device comprising the rechargeable lithium battery of claim 11.

19. An electronic device comprising the rechargeable lithium battery of claim 12.

20. An electronic device comprising the rechargeable lithium battery of claim 13.

* * * * *